United States Patent [19]

Johnson

[11] 4,001,508
[45] Jan. 4, 1977

[54] MESSAGE COMMUNICATION SYSTEM FOR TELEPHONE LINES

[75] Inventor: Richard C. Johnson, Dayton, Ohio

[73] Assignee: Communications International Corporation, Dayton, Ohio

[22] Filed: Sept. 17, 1975

[21] Appl. No.: 614,203

[52] U.S. Cl. .......................... 179/6 D; 179/90 BB; 179/5 P

[51] Int. Cl.[2] ....................................... H04M 1/64

[58] Field of Search ................ 179/6 D, 90 BB, 5 P

[56] References Cited
UNITED STATES PATENTS

| | | | |
|---|---|---|---|
| 3,595,999 | 7/1971 | Cole | 179/6 D |
| 3,790,722 | 2/1974 | Faye | 179/90 BB |

Primary Examiner—Harold I. Pitts
Attorney, Agent, or Firm—Jacox & Meckstroth

[57] ABSTRACT

A plurality of magnetic tape cassettes each has a prerecorded message, and the messages are simultaneously communicated to telephone subscribers by apparatus which incorporates a corresponding plurality of tape decks. The telephone lines and tape decks are independently coupled together by corresponding tape subsystems each having a control system which is activated after a telephone connection has been established. After each tape subsystem completes its message transmission, it releases itself from the corresponding telephone line, and provides an indication that it is again available to be accessed. After all of the prerecorded messages on each tape are transmitted, the tape cassette automatically rewinds.

11 Claims, 3 Drawing Figures

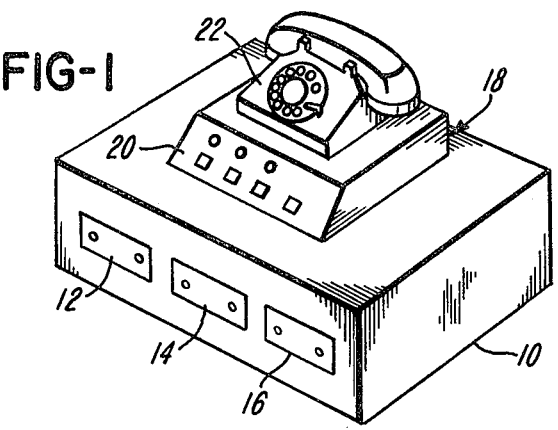
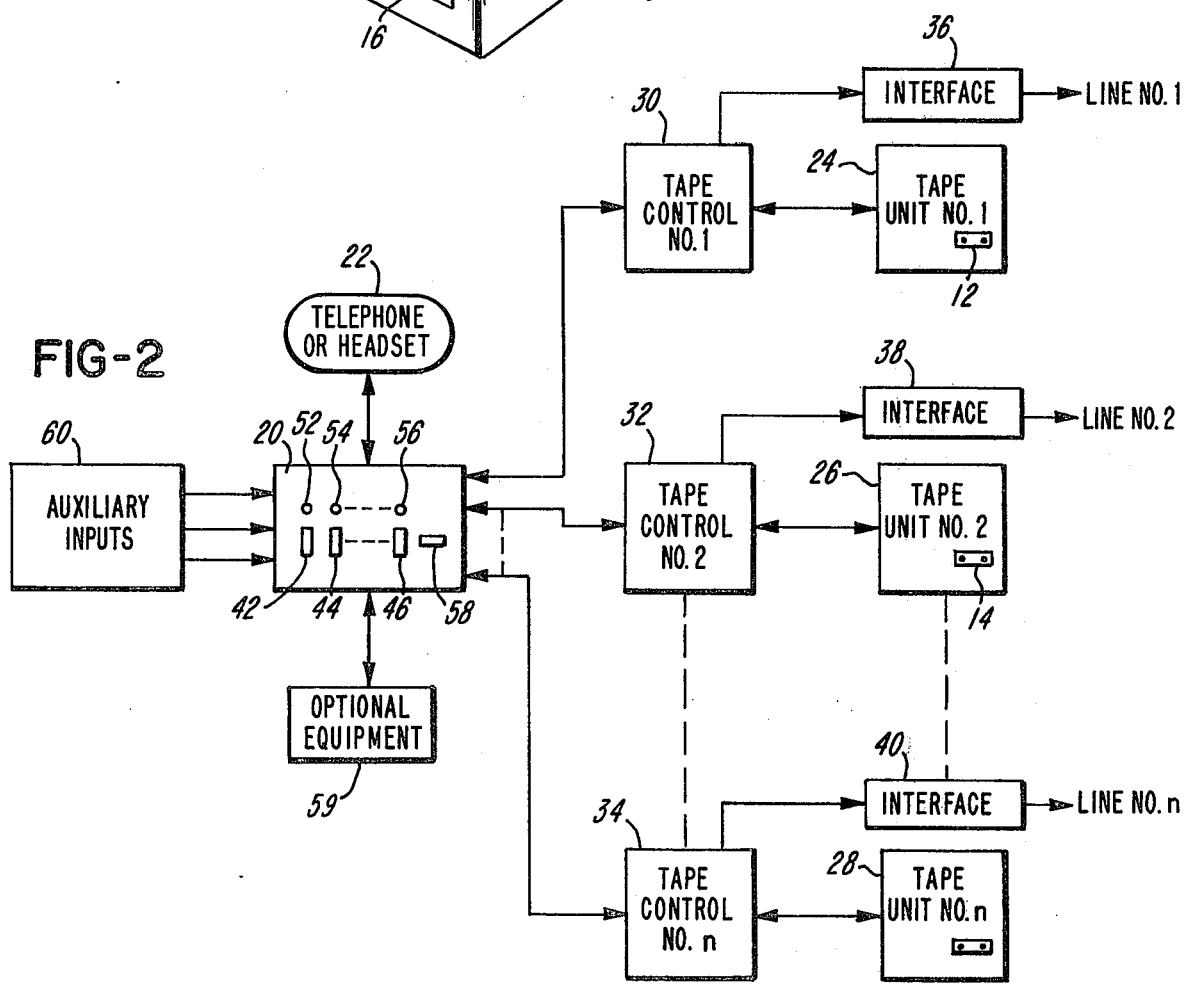

MESSAGE COMMUNICATION SYSTEM FOR TELEPHONE LINES

BACKGROUND OF THE INVENTION

This invention relates to the art of communications, and more particularly, to a system for simultaneously transmitting one or more messages over a plurality of telephone trunk lines.

In apparatus which has been either constructed or proposed for communicating a prerecorded audio message, such as a wake-up call or a commercial advertisement, etc., the apparatus is frequently limited by performance capabilities such as where a single playback station is successively coupled to individual telephone lines, for example, as disclosed in U.S. Pat. No. 3,777,065. Other forms of apparatus are unduly complex, such as where a bulky drum recording mechanism is employed to hold a plurality of prerecorded messages, for example, as disclosed in U.S. Pat. No. 2,920,147. It will be appreciated after studying such message communications systems that they do not provide for a simplified and efficient apparatus by which a message may be transmitted simultaneously over a plurality of communication lines.

OBJECTS AND SUMMARY OF THE INVENTION

It is therefore a broad object of this invention to provide an improved communication system or apparatus for transmitting a prerecorded statement over telephone lines and wherein the apparatus is relatively simple and economical to fabricate and easy to operate. As a more specific object, the invention provides means by which a plurality of record storage means are controllably coupled to a corresponding plurality of telephone lines to transmit a plurality of prerecorded statements simultaneously.

Briefly, these and other objects of the invention are achieved in the illustrated embodiment by utilizing a cassette tape machine having a plurality of tape decks which are individually controllable for the play, stop, and rewind functions in conjunction with operator-controllable means for selectively coupling a prerecorded message from one track of each tape unit to a dialed telephone line communication path. A second track of each tape unit is employed to store stop and rewind control signals which indicate the end of one or more prerecorded messages on the tape cassette.

After an operator has selected a telephone line and dialed and completed a call, he manually actuates a control switch which results in the accessed tape unit entering the play mode and the audio track being coupled to the selected telephone line. As the message is transmitted, the operator accesses another tape unit in order to complete a call and start another message to another telephone subscriber, and so on. When each of the prerecorded messages is completed, a recorded stop signal is issued which stops the corresponding tape unit. One or more of such messages may be recorded along the length of the tape in each cassette, and when the end of the recorded message or messages is reached, a rewind signal recorded on the control track causes the corresponding tape deck to rewind to a reset condition.

Other features and advantages of the invention will be apparent from the following description, the accompanying drawings and the appended claims.

BRIEF DESCRIPTION OF THE DRAWINGS

FIG. 1 is a pictorial representation of communication equipment or apparatus constructed in accordance with the invention;

FIG. 2 is a major block diagram of the apparatus shown in FIG. 1; and

DESCRIPTION OF THE ILLUSTRATED EMBODIMENT

Figure 3:
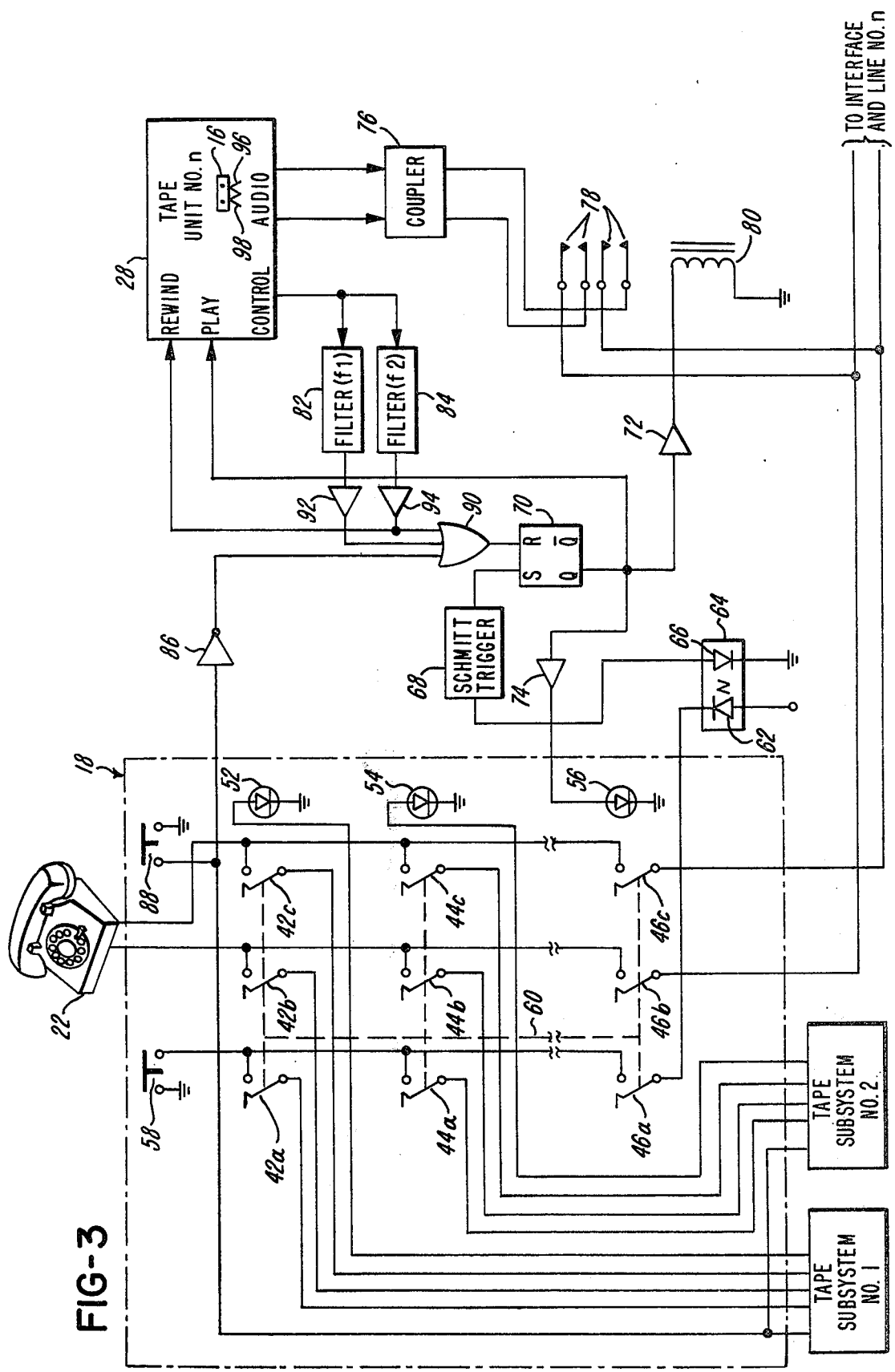
FIG. 3 is a detailed schematic and logic diagram illustrating the control elements contained within each tape sub-system and the switching means employed by an operator to coordinate the dissemination of a plurality of messages over a corresponding plurality of telephone lines.

Referring to FIG. 1, a tape machine 10 includes a plurality of magnetic tape cassette decks for receiving and handling prerecorded cassettes 12, 14 and 16. The tape machine 10 includes two playback heads associated with each tape deck, and each tape deck is individually controllable with play, stop and rewind signals furnished from an external source.

A control unit 18 includes an operator's console 20 and separate logical control means for each of the tape decks of the tape machine 10. A conventional dial telephone 22 is provided for an operator's use in a manner which will become more apparent as the description of the apparatus and its operation progresses. An operator's head set and dial unit or other calling instrument, not shown, may be substituted for the telephone 22 at the operator's convenience.

Attention is now directed to FIG. 2 which is a major block diagram setting out the general interconnection of the apparatus depicted in FIG. 1. FIG. 2, as well as FIG. 1, presents a system in which three tape units 24, 26 and 28 issue messages to three corresponding telephone lines. However, it will be understood that any number of tape units may be utilized in conjunction with a corresponding number of telephone lines. The lowermost tape deck unit 28 illustrated in FIG. 2 is designated tape unit No. n to emphasize this flexibility. The first tape deck 24 has its various control and audio inputs and outputs connected to a tape control unit 30 which selectively couples the audio message recorded on a cassette 12 from the tape unit 24 to a telephone line interface 36 in order to access telephone line No 1. The tape control 30, which is contained within the control unit 18 (FIG. 1) issues control signals to the tape unit 24 after being activated from the operator's console 20. Similarly, a second tape deck unit 26 responds to control signals from a tape control unit 32 which selectively couples the audio message stored on a cassette 14 through an interface 38 to telephone line No. 2. Tape deck unit 28 is controlled by a tape control unit 34 in the same manner to selectively issue the message stored on cassette 16 through telephone interface 40 and to telephone line No. n.

In operation, the cassettes 12, 14 and 16 are prerecorded to carry, on one track, a message which is to be communicated to many telephone subscribers. According to its length, the message may require the full tape cassette or may be repeated several times along the tape in each cassette. Between each repetition of the message, a stop tone burst consisting of a brief signal at a first predetermined frequency is recorded on a second control track. After the last repetition of the message which can be accommodated on one cassette, a rewind tone burst is recorded on the control track. The rewind tone is a signal at a second predetermined frequency to differentiate it from the stop signal. Ordinarily, the cassettes 12, 14 and 16 contain identical information although different messages could be carried on the different cassettes or on any one of the cassettes.

The operator, using a conventional dial or touchtone telephone 22 or a functionally equivalent operator's head set and dial unit 22, first depresses one of the latching switches 42, 44 or 46 and then dials a number. After a connection has been established, the operator depresses momentary switch 58 which brings the tape control unit associated with the depressed one of the latching switches into operation to issue the prerecorded message from its corresponding tape deck to the corresponding telephone line. As soon as the tape control unit begins to function, one of the lights, 52, 54 and 56 proximate the actuated one of the latching switches 42, 44 or 46, is illuminated to indicate that the particular tape deck is in operation. Immediately, the operator can depress a second one of the latching switches 42, 44 and 46 which is available as indicated by its indicator light not being energized, and again uses the telephone 22 to establish contact with another subscriber, thereafter again depressing the momentary switch 58 to cause the message to be issued from the second tape deck to its corresponding telephone line. This process can be repeated to any desired extent, so long as tape decks are available, to permit a single operator to bring the message to a very large number of telephone subscribers.

More elaborate systems may utilize optional equipment represented by the block 59. Such optional equipment could include an automatic dialer, an automatic line sensor, a message decoder, and/or a printer. This equipment, which is commercially available, can be connected to the system to obtain automatic dialing and a record of the numbers dialed as well as subscriber responses to questions which may be incorporated into the message. Similarly, auxiliary inputs 60 may be employed whereby the message issuing procedure may be started under control of a time clock, safety signals such as fire control, or the like.

FIG. 3 illustrates the logic circuitry of tape control unit 34 and its interconnection with the tape deck 28 and the operator control unit 18. It will be observed that the latching switches 42, 44 and 46 are mutually exclusively actuable by mechanical linkage means 60; i.e., as one set of contacts is closed, a previously actuated set will automatically be released.

Consider now the sequence of events when the switch 46 is actuated. Contacts 46a, 46b and 46c all close, and telephone line No. n is connected directly to the dial telephone 22 through contacts 46b and 46c. The operator is therefore able to dial a number on this line using the telephone 22 or, as noted above, a conventional operator's head set and dial unit which can be substituted for the telephone. When a connection is established to a subscriber, the operator depresses the momentary switch 58 which grounds the cathode electrode of a light emitting diode 62 in an optocoupler 64 within the tape control unit associated with the tape deck 28.

The anode electrode of the light emitting diode 62 is connected to a positive voltage source such that, upon depression of the momentary switch 58, the light emitting diode 62 is energized, and the light sensitive diode 66 in the optocoupler 64 becomes conductive. A momentary ground is therefore observed at the input terminal to a Schmitt trigger 68 which responds by issuing an output pulse to the set input terminal of a flip-flop 70. As a result, the Q output terminal from the flip-flop 70 assumes the logic true state which is coupled as a control signal to the play input of tape unit 28, to a relay driver 72 and to the input of a lamp driver 74. Thus, the tape unit 28 enters the play mode, and the message prerecorded on the message track of the cassette 16 is issued to an impedance matching coupler 76 and to a set of contacts 78. In the meantime, the relay driver 72 will have energized relay coil 80 to close the contacts 78 whereby the audio message is fed to the telephone line. Lamp driver 74 energizes a light emitting diode 56 disposed adjacent the switch 46 on the operator's console 20 to indicate that channel No. n is in operation. An incandescent lamp or other type of indicator may, of course, readily be substituted for the light emitting diode 56.

Having started the playback of the message onto the telephone line No. n, the operator may depress another of the latching switches, such as switch 42, which releases contact 46a, 46b and 46c to break the connection between the dial telephone 22 and telephone line No. n and establishes corresponding contact between the telephone 22 and tape sub-system No. 1 which includes the tape control unit 30 and the tape deck 24 as shown in FIG. 2. The message is then sent out on line No. 1 as the operator follows the same sequence of operation and then again follows the same procedure by depressing switch 44 to address tape sub-system No. 2.

In the meantime, as the message from the tape unit 28 is played back, it will eventually be completed, and a stop signal prerecorded on the control track of the cassette 16 at a frequency $f_1$ will be applied to the input terminals of first and second filter units 82 and 84. Filter units 82 and 84 may each include a bandpass filter and a rectifier whereby a low level unidirectional pulse is obtained when a signal at the bandpass frequency is applied to the input terminals. Filter unit 82 is tuned to the stop signal frequency such that, at the end of a message, the tone burst comprising the stop signal is sensed by the filter unit 82 and amplified to a normal logic level by an amplifier 92. Amplifier 92 drives one input to an OR-gate 90 which, in turn, drives the reset input to the flip-flop 70. As a result, when a stop signal appears on the control track of the cassette 16, the flip-flop 70 is reset, and its Q output assumes the false state whereby the drive to the play input to the tape unit 28, the relay driver 72, and the lamp driver 74 are lost. Thus, the relay coil 80 is deenergized, and the relay contact 78 opens to break the circuit between the tape deck audio output and the telephone line. Simultaneously, the indicator lamp 56 is extinguished to indicate on the operator's console 20 that tape deck No. n has completed a cycle of operation and may be accessed again at the operator's option.

When all of the message repetitions recorded on the cassette 16 have been played, a tone burst at the frequency $f_2$ from the control track will be applied to the inputs to filter units 82 and 84 and will pass through the filter unit 84 which issues a low level pulse amplified to a normal logic level by the amplifier 94. The amplifier 94 drives another input to the OR-gate 90 which is therefore enabled to again reset the flip-flop 70, resulting in the disengagement of the tape deck audio output from the telephone line and the resultant indications on the operator's control unit, as previously noted. In addition, the amplifier 94 drives the rewind control input to the tape deck 28 which therefore commences to rewind. When the rewinding operation is complete, the first message stored on the audio track of the cassette 16 is in position for playback on the next subsequent selection of tape sub-system No. n.

If it is desired to abruptly terminate all messages in progress simultaneously, a master reset momentary push button 88 is actuated which places a ground potential at the input to an inverter 86 in tape sub-system No. n and corresponding inverters disposed within tape sub-systems No. 1 and 2. Logic inverter 86 drives another input to OR-gate 90 which is therefore enabled when the push button 82 is actuated to reset the flip-flop 70, again results in deenergization of the relay coil 80, the extinguishment of the lamp 56, and the defeat of the play input to the tape deck 28.

Those skilled in the art will appreciate that tape decks employing endless cartridges may readily be substituted for the cassette decks noted in the illustrative embodiment. The use of such endless cartridges obviates the necessity for accommodating the rewind function such that a modest simplification in the logic used in the control units may be achieved thereby. The endless cartridges may also be used in conjunction with corresponding tape decks which provide for a "fast forward" to the initial start position when the deck receives a signal that all messages have been transmitted.

While it will be apparent that the embodiment of the invention herein disclosed is well calculated to fulfill the objects of the invention, it will be appreciated that the invention is susceptible to modification, variations and change without departing from the proper scope or fair meaning of the appended claims.

I claim:

1. A communications system adapted for delivering prerecorded messages over a plurality of telephone lines, comprising:
   A. a corresponding plurality of tape decks, each of said tape decks having:
      i. a play control input;
      ii. a first playback transducer for providing a first audio output signal; and
      iii. a second playback transducer for providing a second control output signal;
   B. a prerecorded tape for each of said tape decks, each said tape having recorded thereon;
      i. at least one message on a first track thereof; and
      ii. a first control signal recorded as a first predetermined frequency tone burst on a second track thereof, said first control signal occurring after the completion of said message;
   said first and second transducers being adapted to sense the audio and control signals recorded, respectively, on said first and second tracks;
   C. a telephone calling instrument;
   D. a control unit including:
      i. selection means for selectively coupling said telephone calling instrument to each of said telephone lines; and
      ii. signaling means for selectively issuing an operation control signal; and
   E. control means for each one of said tape decks, said control means including:
      i. first means responsive to the operation control signal for applying a play signal to said play control input of the one of said tape decks associated therewith; and
      ii. second means responsive to the operation control signal for coupling the first audio output signal from said one tape deck to its corresponding telephone line.

2. The communications system as defined in claim 1 wherein each said control means includes:
   A. means for sensing the occurrence of the first control signal and developing a stop signal therefrom;
   B. first means responsive to the stop signal for removing the play signal from said play control input to said one tape deck; and
   C. second means responsive to the stop signal for decoupling the first audio output signal of said one tape deck from its corresponding telephone line.

3. The communications system as defined in claim 2 wherein each prerecorded tape has a plurality of messages recorded on said first track and a second control signal recorded on said second track, said second control signal being positioned to occur after the completion of the last one of the messages recorded on said first track, each of said tape decks further including a rewind control input and each of said control means further including:
   A. means for sensing the occurrence of the second control signal and developing a rewind signal therefrom; and
   B. means coupling the rewind signal to said rewind control input of the corresponding one of said tape decks.

4. The communications system as defined in claim 3 wherein said first and second means responsive to said stop signal are identically responsive to the rewind signal.

5. The communications systems of claim 4 which further includes:
   A. indicator means representing each one of said tape decks to indicate whether said one tape deck is operating in a play mode;
   B. third means responsive to the operation control signal to set said indicator means to a first indicating state; and
   C. said third means being identically responsive to said stop and rewind signals to set said indicator means to a second indicator state.

6. A communications system adapted for delivering prerecorded messages over a plurality of telephone lines comprising:
   A. a corresponding plurality of tape decks, each of said tape decks having:
      i. a play control input;
      ii. a first playback transducer for providing a first audio output signal; and
      iii. a second playback transducer for providing a second control output signal;
   B. a prerecorded tape for each of said tape decks, each said tape having recorded thereon:
      i. at least one message on a first track thereof; and
      ii. a first control signal recorded as a first predetermined frequency tone burst on a second track thereof, said first control signal occurring after the completion of said message;
   said first and second transducers being adapted to sense the audio and control signals recorded, respectively, on said first and second tracks;
   C. control means for each of said tape decks, each said control means including:

i. a flip-flop having first and second stable states;
ii. first means responsive to the first state of said flip-flop for applying a play signal to said play control input of the one of said tape decks associated therewith;
iii. second means responsive to the first state of said flip-flop for coupling the first audio output signal from said one tape deck to its corresponding telephone line; and
iv. means responsive to said first control signal from said one tape deck to switch its said flip-flop to its second state;
D. a telephone calling instrument; and
E. an operator's control unit including:
i. first momentary switch means;
ii. a plurality of selection switches, each selection switch including a plurality of contact pairs, two of said contact pairs of each selection switch adapted to couple said dialing instrument to one of said telephone lines, a third contact pair of each selection switch adapted to couple said first momentary switch means to said flip-flop in the one of said control means associated with said one telephone line whreby actuation of said first momentary switch forces said flip-flop to its first state.

7. The communications system of claim 6 in which each of said tape decks includes a rewind control input and each said prerecorded tape has a plurality of messages recorded on said first track and a second control signal recorded as a second predetermined frequency tone burst on said second track, said second control signal occurring after the completion of the last one of the messages recorded on said first track, and said control means for each one of said tape decks further includes:
A. first means responsive to said second control signal from said one tape deck to switch its said flip-flop to its second state; and
B. means for coupling said second control signal to said rewind input to said one tape deck.

8. The communications system of claim 7 in which said second means responsive to the first state of said flip-flop in each said control means comprises:
A. a relay coil;
B. a relay driver coupled to energize said coil when said flip-flop is in said first state; and
C. first and second pairs of normally-open contacts coupled, respectively, to said first playback transducer and to a corresponding telephone line pair.

9. The communications system as defined in claim 8 and which further includes:
A. indicator means representing each one of said tape decks;
B. third means in each said control means responsive to the first state of said flip-flop to set the corresponding one of said indicator means to a first indicating state; and
C. means in each said control means responsive to the second state of said flip-flop to set said one indicator means to a second indicating state.

10. The communication system of claim 9 in which each of said indicator means comprises a light issuing device.

11. A communications system for rapidly transmitting prerecorded messages over a plurality of telephone lines to telephone subscribers, said system comprising a telephone calling instrument, a corresponding plurality of magnetic tape decks each adapted to receive a corresponding magnetic tape having one track with a prerecorded audio message and a second track with a control signal following the prerecorded message, first control means for selectively connecting said telephone calling instrument to each of the telephone lines, second control means for selectively connecting each of said tape decks to its corresponding telephone line, each of said tape decks having means for automatically rewinding the magnetic tape in response to the control signal on the corresponding tape to provide for resetting said tape decks for repetitive play, means for indicating when the transmission of each audio message is completed by the corresponding said tape deck, and means connecting said first and second control means to permit simultaneous actuation of said tape decks for transmitting the audio messages simultaneously to a plurality of telephone subscribers.

* * * * *